Figure 1:
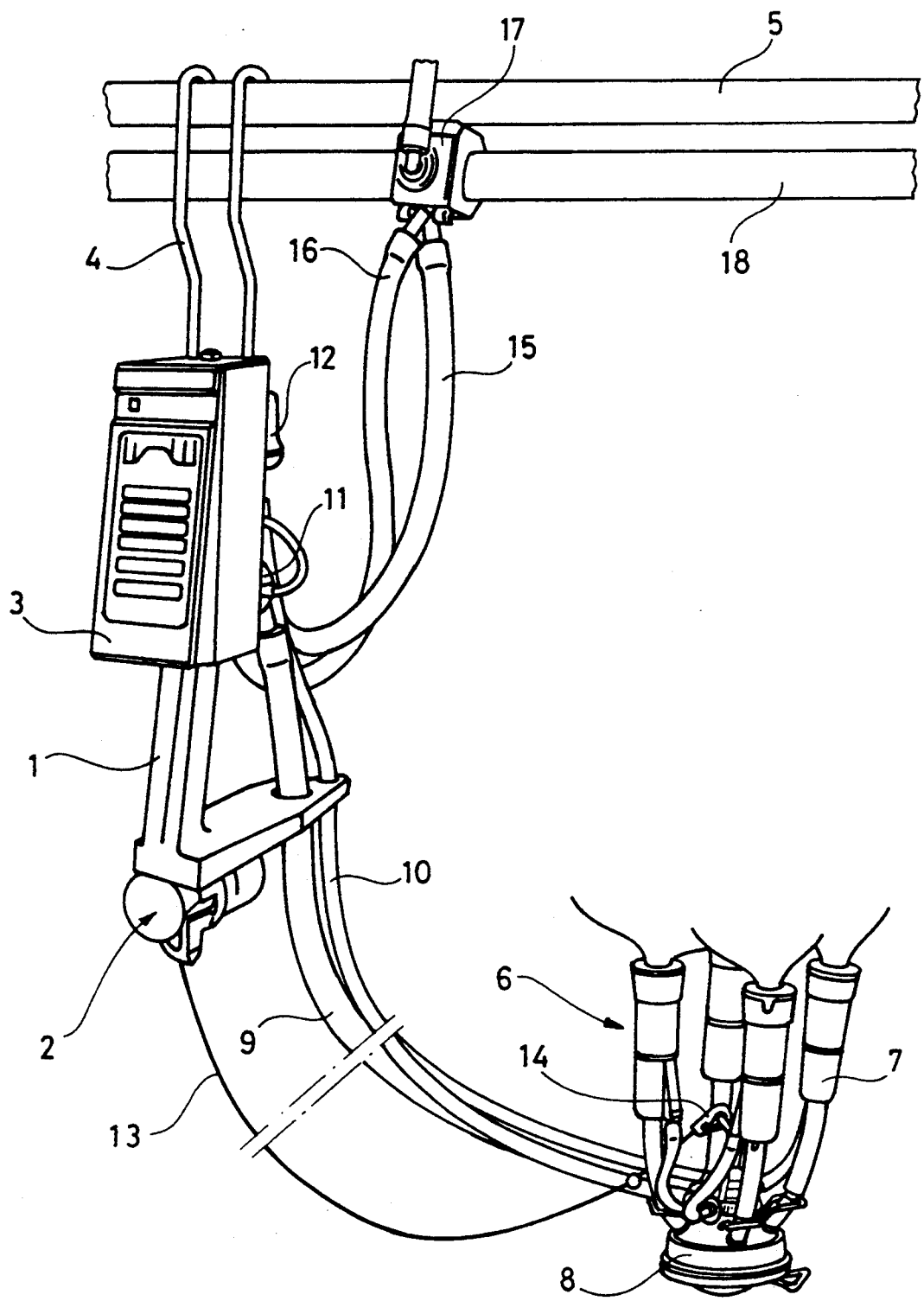

United States Patent [19]
Nilsson et al.

[11] Patent Number: 5,431,128
[45] Date of Patent: Jul. 11, 1995

[54] DEVICE FOR AUTOMATIC REMOVAL OF MILKING APPARATUS FROM AN ANIMAL'S TEATS

[75] Inventors: Rutger Nilsson, Södertälje; Hans Olofsson, Huddinge, both of Sweden

[73] Assignee: Alfa-Laval Agriculture International AB, Tumba, Sweden

[21] Appl. No.: 167,944

[22] PCT Filed: Jun. 23, 1992

[86] PCT No.: PCT/SE92/00457

§ 371 Date: Dec. 20, 1993

§ 102(e) Date: Dec. 20, 1993

[87] PCT Pub. No.: WO93/00002

PCT Pub. Date: Jan. 7, 1993

[30] Foreign Application Priority Data

Jun. 28, 1991 [SE] Sweden .................. 9101997

[51] Int. Cl.⁶ ............................................. A01J 5/017
[52] U.S. Cl. .................................................. 119/14.08
[58] Field of Search ................ 119/14.08, 14.1, 14.18; 242/390.5, 390.6; 415/140, 170.1; 418/257

[56] References Cited

U.S. PATENT DOCUMENTS

| | | | |
|---|---|---|---|
| 3,150,842 | 9/1964 | Weber | 242/390.5 |
| 3,435,732 | 4/1969 | Gilreath et al. | 418/257 |
| 3,471,885 | 10/1969 | McLoughlin et al. | 242/390.5 |
| 3,789,798 | 2/1974 | Reisgies et al. | |
| 3,814,056 | 6/1974 | Maehans | |
| 3,976,257 | 8/1976 | Fohl | 242/390.5 |
| 4,034,713 | 7/1977 | Umbaugh | 119/14.08 |
| 4,385,873 | 5/1983 | Richter | 418/257 |
| 4,473,196 | 9/1984 | Sammann et al. | 242/390.5 |
| 4,523,545 | 6/1985 | Kummer | 119/14.08 |
| 4,741,287 | 5/1988 | Kummer | |
| 4,838,203 | 6/1989 | Ellis et al. | 119/14.08 |

FOREIGN PATENT DOCUMENTS

| | | |
|---|---|---|
| 0213660 | 5/1990 | European Pat. Off. |
| 0258938 | 10/1991 | European Pat. Off. |
| 233480A1 | 3/1986 | Germany |
| 138428 | 5/1975 | Norway |
| 417348 | 10/1934 | United Kingdom ............ 418/257 |
| 463417 | 3/1937 | United Kingdom ............ 418/257 |

*Primary Examiner*—Gene Mancene
*Assistant Examiner*—Todd E. Manahan
*Attorney, Agent, or Firm*—Hovey, Williams, Timmons & Collins

[57] ABSTRACT

A device for automatic removal of a milking apparatus (6) comprises an operating unit (2) having a cord drum with a cord (13), and a driving motor for turning the cord drum for winding the cord on the latter. The free end of the cord is connected to the milking apparatus, whereby the cord pulls the milking apparatus off the teats of the animal as the cord drum is turned by the driving motor. According to the invention, the driving motor comprises a pneumatically operated motor. The advantage is that the operating unit can be made compact and with a low weight, and that the milker can unwind the cord without any substantial resistance from the motor when the motor is inactivated.

10 Claims, 3 Drawing Sheets

DEVICE FOR AUTOMATIC REMOVAL OF MILKING APPARATUS FROM AN ANIMAL'S TEATS

The present invention relates to a device for automatic removal of a milking means from the teats of an animal after finished milking. The removal device comprises a frame, and an operating unit carried by the frame. The operating unit has a rotatable cord drum, a cord, which is windable on the cord drum and provided with a connection member at its free end for connection to the milking means to be removed, and a driving means arranged to turn the cord drum for winding up the cord, so that the milking means is pulled off the teats of the animal.

A removal device of this kind is known from DD 233 480. The known device is compact and therefore especially suited for portable milking equipments for serving tied up cows. However, it has a serious drawback, since the driving means for winding up the cord is constituted by a relatively strong spiral spring. As a consequence, the milker has to tighten the spiral spring when unwinding the cord to connect the connection member to a milking means which previously has been applied on the teats of a cow. The reason why a spiral spring has to be relatively strong is due to the fact that a modern milking means comprising teat cups, hoses and a teat cup claw, has a weight of about three kg. Therefore, the spiral spring should be able to generate a pulling power corresponding to at least five kg. The frequent tightenings of a spiral spring against the action of said pulling power, when applying the milking means on the cows to be milked, of course will be laborious for the milker.

The object of the present invention is to provide a compact low-weight device for automatic removal of a milking means, which device is easy to connect to a milking means applied on the teats of a cow.

This object is obtained by means of a device for automatic removal of a milking means form the teats of an animal after milking. Such a device includes a frame, a rotatable cord drum carried by the frame, a cord having two ends and attached to the cord drum at one end with the cord windable on the cord drum, a connection member attached to the cord at the other end, and a pneumatic motor arranged to turn the cord drum for winding up the cord on the cord drum. The connection member is adapted to connect to the milking means to be removed, and the cord pulls the milking means off the teats of the animal as the pneumatic motor is operated. As a result the cord can be easily unwound without any substantial resistance from the motor, when this is inactivated. The motor is suitably connectable to the necessary air conducting vacuum conduits for providing the pulsating pressure in the teat cups of the milking means.

Preferably, the pneumatic motor is a rotating sliding vane motor, whereby the automatic removal device can be designed particularly compact. (As an alternative the motor may comprise a number of small piston-cylinder means, for instance of the well-known arrangement which comprises four piston-cylinder means orientated in a cross and in engagement with a slide member in the centre of the cross, the slide member being connected to the cord drum for turning the latter).

With advantage, the motor is in drivable engagement with the cord drum via a reduction gearing, suitably a planetary gearing. The gear ratio of the reduction gearing should be chosen in the range of 1:3 to 1:8. The reduction gearing enables use of a cord drum with a relatively large diameter. This leads to that the required turning moment for turning the cord drum will be approximately unchanged during the entire winding of the cord, since the diameter of the formed cord coil on the large coil drum only increases insignificantly during the upwinding. Said unchanged turning moment has the consequence that the rotational speed of the rotating sliding vane motor can be kept substantially constant during the upwinding of the cord, which ensures the required output of the relatively small motor.

In this connection it should be noted that for compensating an increased turning moment for turning the cord drum, the power of the rotating sliding vane motor cannot be increased by increasing the pressure difference across the motor. This is so because the existing vacuum conduit, to which the motor is connected, usually distributes a vacuum of at most 50 kPa, which cannot be increased. In addition, it would be unsuitable to choose a stronger motor as an alternative for enabling a higher output, because in such a case the removal device would become heavier and more bulky.

According to a preferred embodiment of the removal device according to the invention the motor has a rotor shaft, which is provided with a number of pairs of vanes. The vanes in each vane pair are slidable along the same radial direction relative to the rotor shaft. A housing forms a cylindrical rotor chamber in which the rotor shaft extends in parallel to the centre axis of the rotor chamber. The rotor chamber is divided by the vanes into separate chambers orientated after one another around the rotor shaft. Preferably, the vanes in each vane pair abut against one another via spacing members, whereby each vane pair together with its associated spacing members forms a unit which is radially slidable relative to the rotor shaft. As a result the frictional resistance between the vanes and the walls of the rotor chamber will be relatively weak during operation of the sliding vane motor, as compared with conventional sliding vane motors, the vanes of which abut against the walls of the rotor chamber under the influence of springs.

Suitably, the cylindrical rotor chamber has an extension transverse to the rotor shaft which is substantially constant along the circumference of the rotor chamber, which gives the rotor chamber a slightly elliptically formed cross-section.

Figure 2:
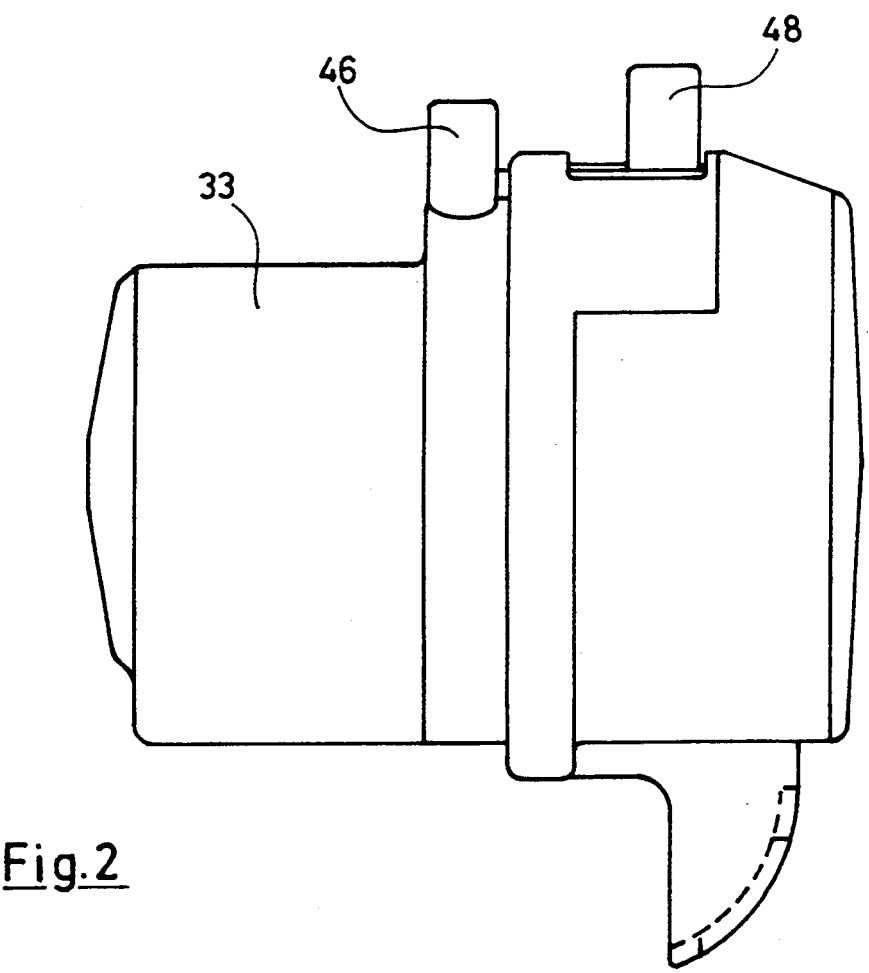
Figure 3:
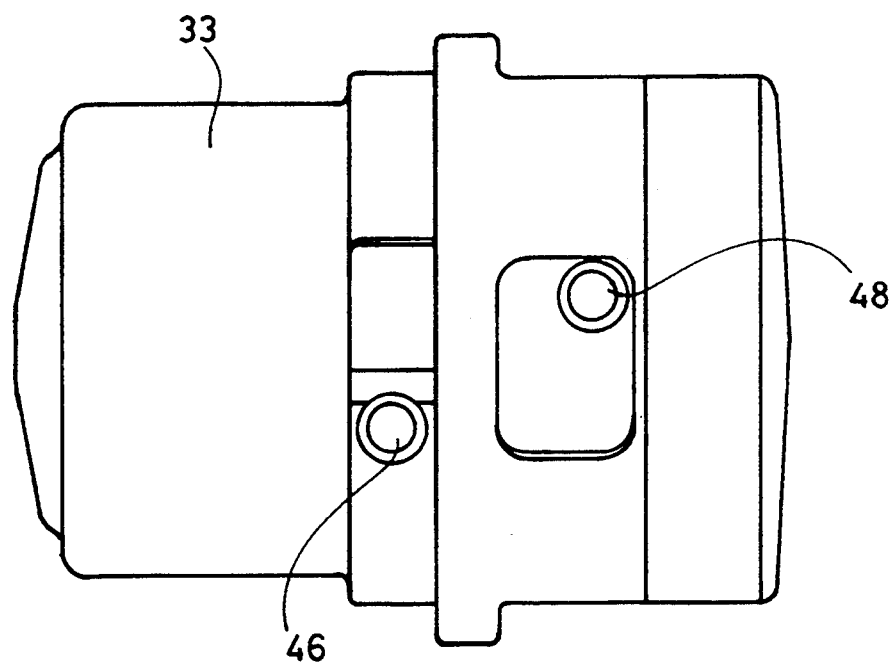
Figure 4:
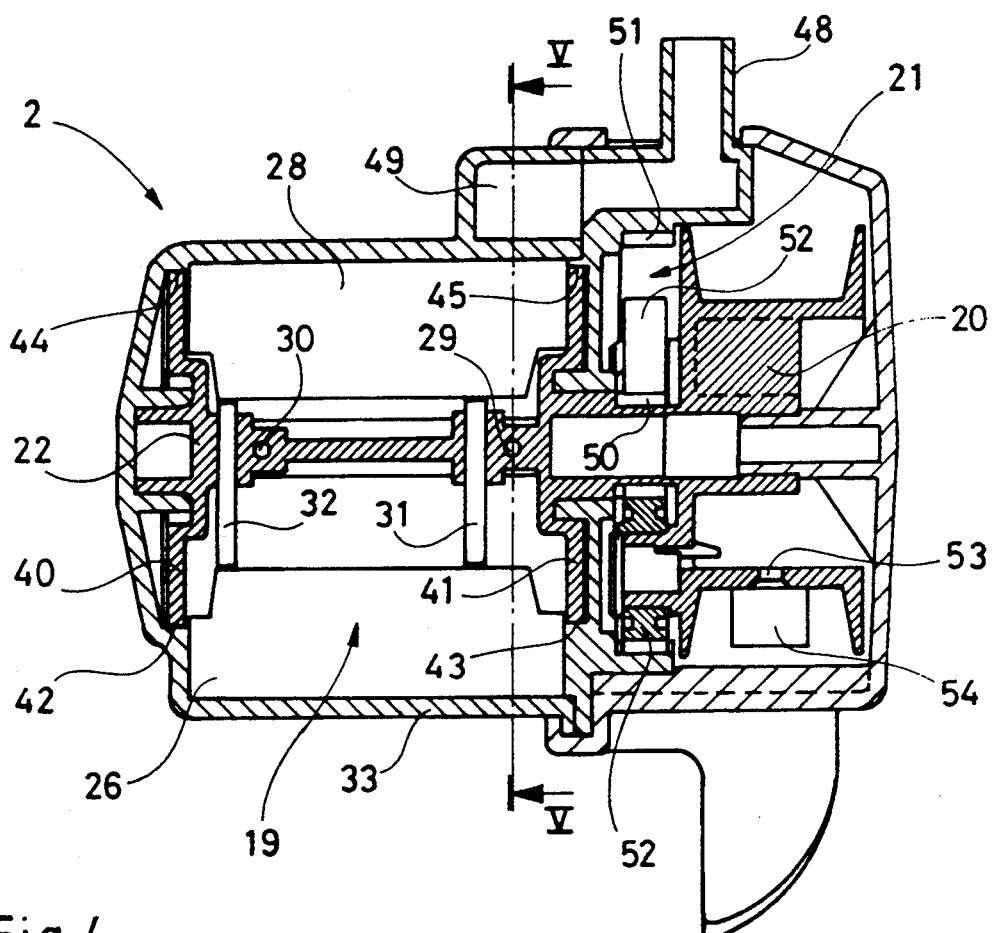
Figure 5:
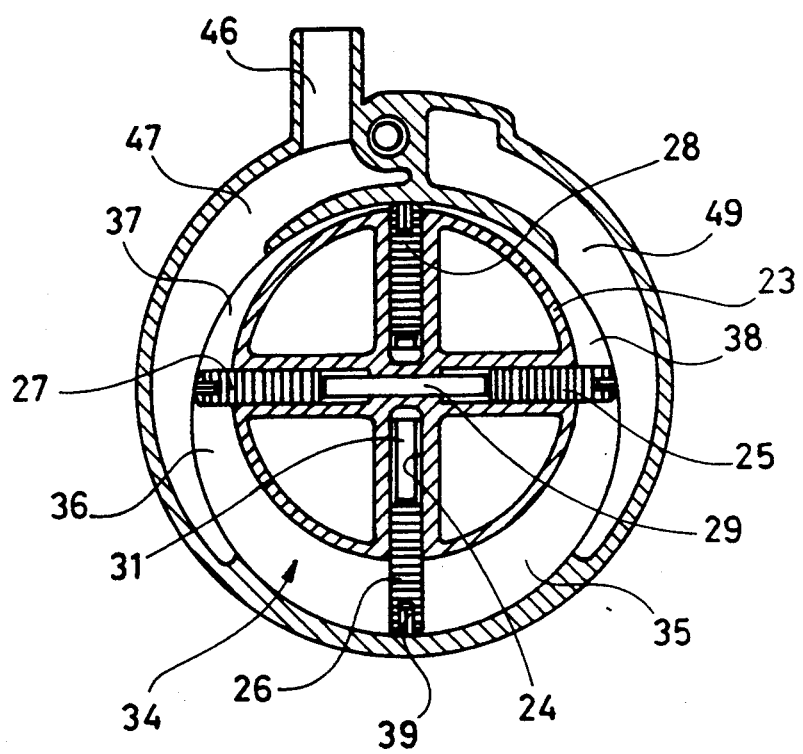

The removal device according to the invention is described in more detail in the following with reference to the accompanying drawings, in which FIG. 1 shows a milking equipment with a removal device according to the invention, FIG. 2 shows a side view of an operating unit of the removal device according to FIG. 1, FIG. 3 shows a view from above of the operating unit according to FIG. 1, FIG. 4 shows a view of a longitudinal section through the operating unit according to FIG. 2, and FIG. 5 shows a view of a section along the line V—V in FIG. 4.

The milking equipment shown in FIG. 1 comprises a frame 1, on which an operating unit 2 and a control means 3 are attached. The frame 1 is by means of a clamp 4 suspendable from existing pipe conduits, for instance a vacuum conduit 5. From a milking means 6, comprising four teat cups 7 and a teat cup claw 8, a milk hose 9 and a pulsation hose 10 extend to a milk flow meter 11 and a pulsator 12, respectively, carried by the frame 1. A cord 13 extends from the operating unit 2 to the teat cup claw 8 and is connected to the latter by means of a connection member 14. From the milk flow meter 11 and the pulsator 12 a milk hose 15 and an air hose 16, respectively, extend upwards to a connection member 17, which is arranged on a milk conduit 18. The upper ends of the hoses 15 and 16 are provided with means for quick engagement with the connection member 17. The connection member 17 is adapted to connect the milk hose 15 and the air hose 16 to the milk conduit 18 and the vacuum conduit 5, respectively.

The operating unit 2 comprises a pneumatically operated, rotating sliding vane motor 19, a cord drum 20, and a planetary gearing 21, which is connected between the motor 19 and the cord drum 20.

The motor 19 has a rotor shaft 22 with a circular cylindrical mantle 23. In the mantle 23 there are four radial pockets 24 arranged in two pairs of opposite pockets extending transversely to one another. Four vanes 25-28 are slidable in the pockets 24. Each pair of opposite vanes 25,27 and 26,28 abut against one another via spacing members in the form of two cylindrical pins 29,30 and 31,32. As a result each pair of vanes 25,27 and 26,28 together with its respective associated pins 29,30 and 31,32 forms a unit which is radially slidable relative to the rotor shaft 22.

Further, the motor 19 has a housing 33, which forms a cylindrical rotor chamber 34 in which the rotor shaft 22 extends in parallel with the centre axis of the rotor chamber 34. The extension of the cylindrical rotor chamber 34 transverse to the rotor shaft 22 is substantially constant along the circumference of the rotor chamber 34, which gives the rotor chamber 34 a slightly elliptical cross-section. The rotor chamber 34 is divided by the vanes 25-28 into four separate chambers 35-38 disposed in series around the rotor shaft 22. The vanes 25-28 seal against the cylindrical wall of the rotor chamber 34 by means of resilient sealing strips 39 arranged on the radially outer ends of the vanes 25-28.

Each pocket 24 is axially defined by two opposite walls 40,41 with radially outer ends, which constitute parts of two circular surface portions 42,43 of the mantle 23. The housing 33 is formed with two inner circular shoulders 44,45, which are situated concentrically with the rotor shaft 22 and radially aligned with the respective circular surface portions 42,43 of the mantle 23. The shoulders 44,45 of the housing 33 extend close to the surface portions 42,43 of the mantle 23 to seal between the separate chambers 35-38.

The housing 33 has an inlet member 46 for atmosphere. The inlet member 46 is connected to the rotor chamber 34 via an inlet passage 47. Further, the housing 33 has an outlet member 48 for connection to a source of vacuum. The outlet member 48 is connected to the rotor chamber 34 via an outlet passage 49.

One end of the rotor shaft 22 is formed with a gear ring 50, which constitutes a sun wheel in the planetary gearing 21. The planetary gearing 21 has a stationary gear ring 51 formed in the housing 33. Three planet wheels 52 are journalled on the cord drum 20 at the same radial distance from the rotational axis of the cord drum 20 and are in engagement with the gear rings 50 and 51. The gear ratio of the planetary gearing 21 is 1:5, which consequently means that the cord drum 20 is rotated one revolution for every five revolutions the rotor shaft 22 is rotated by the motor 19.

The cord drum 20 is provided with a mounting hole 53, through which one end of the cord 13 can be inserted to enable the cord 13 to be wound on the cord drum 20. The housing 33 is provided with an opening 54, through which the cord 13 passes during winding and upwinding the cord 13.

The new removal device is operated in the following way:

First the milker suspends the milking equipment from the vacuum conduit 5 by means of a clamp 4 close to the cow to be milked. Then the milker disengages the milking means 6 from the frame 1 and brings it to the teats of the cow, the cord 13 being unwound from the cord drum 20. Since the motor 19 at this stage is not activated it only exerts a minor braking resistance on the cord drum 20 during the unwinding of the cord 13. When the milker has applied the teat cups 7 on the teats of the cow the milking starts, extracted milk being passed through the teat cup claw 8, the milk hose 9, the milk flow meter 11, the milk hose 15 and into the milk conduit 18 via the connection member 17.

At the end of the milk extraction the milk flow meter 11 senses the ceasing milk flow and gives a signal to the control means 3, which activates the motor 19 by connecting the outlet member 48 to the vacuum conduit 5 via the air hose 16. As a result an underpressure arises in the outlet passage 49 and in the separate chambers 35-38 which at the time communicate with the outlet passage 49. Thus, in the rotational position shown in FIG. 5 an underpressure arises in the chambers 35 and 38, which results in that the rotor shaft 22 is rotated in counter-clockwise direction. The cord drum 20 is turned by the rotor shaft 22 via the planetary gearing 21, so that the cord 13 is wound on the cord drum 20 and pulls the teat cup means 6 off the teats of the cow.

When the cord 13 has been completely wound on the cord drum 20 the motor 19 is nevertheless kept activated until the milker has suspended the milking means 6 from the frame 1. (As an alternative the cord 13 may be provided with a retaining member, which retains the cord 13 from unwinding, as the motor is inactivated. In this case the milker releases such a retaining member in connection with the next milking occasion). Then the milker can release the clamp 4 and the hoses 15 and 16 from the vacuum conduit 5 and the connection member 17 and carry the milking equipment to the next cow to be milked.

We claim:

1. A device for the automatic removal of a milking means from the teats of an animal after milking, comprising:
   a frame;
   a rotatable cord drum carried by the frame;
   a cord having two ends and attached to the cord drum at one end, said cord being windable on the cord drum;
   a connection member attached to the cord at the other end thereof and adapted for connection to the milking means to be removed; and
   a pneumatic motor arranged to turn the cord drum for winding up the cord on the cord drum.

2. A device according to claim 1, wherein the pneumatic motor is a rotating sliding vane motor.

3. A device according to claim 2, wherein the pneumatic motor is in drivable engagement with the cord drum via a reduction gearing.

4. A device according to claim 3, wherein the reduction gearing is a planetary gearing.

5. A device according to claim 4, wherein the gear ratio of the planetary gearing is chosen in the range of 1:3 to 1:8.

6. A device for the automatic removal of a milking means from the teats of an animal after milking, comprising:
- a frame;
- a rotatable cord drum carried by the frame;
- a cord having two ends and attached to the cord drum at one end, said cord being windable on the cord drum;
- a connection member attached to the cord at the other end thereof and adapted to connect to the milking means to be removed; and
- a pneumatic rotating sliding vane motor arranged to turn the cord drum for winding up the cord on the cord drum, said pneumatic motor being in drivable engagement with the cord drum via a reduction gearing.

7. A device according to claim 6, wherein the reduction gearing is a planetary gearing.

8. A device according to claim 7, wherein the gear ratio of the planetary gearing is chosen in the range of 1:3 to 1:8.

9. A device for the automatic removal of a milking means from the teats of an animal after milking, comprising:
- a frame;
- a rotatable cord drum carried by the frame;
- a cord having two ends and attached to the cord drum at one end, said cord being windable on the cord drum;
- a connection member attached to the cord at the other end thereof and adapted to connect to the milking means to be removed; and
- a pneumatic rotating sliding vane motor arranged to turn the cord drum for winding up the cord on the cord drum, said pneumatic motor being in drivable engagement with the cord drum via a reduction gearing of the planetary type.

10. A device according to claim 9, wherein the gear ratio of said planetary gearing is chosen in the range of 1:3 to 1:8.

* * * * *